(12) United States Patent
Bolduc et al.

(10) Patent No.: US 7,474,264 B2
(45) Date of Patent: Jan. 6, 2009

(54) VEHICLE RF DEVICE DETECTION SYSTEM AND METHOD

(75) Inventors: Timothy D. Bolduc, Westfield, IN (US); Mark A. Pollard, Greentown, IN (US); Gregory K. Scharenbroch, Kokomo, IN (US); Matthew R. Smith, Westfield, IN (US); Gerald J. Witt, Carmel, IN (US); Duane N. Mateychuk, Westfield, IN (US); Joseph E. Harter, Jr., Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 144 days.

(21) Appl. No.: 11/156,124

(22) Filed: Jun. 17, 2005

(65) Prior Publication Data

US 2006/0284769 A1    Dec. 21, 2006

(51) Int. Cl.
*G01S 3/02* (2006.01)
*H04Q 7/20* (2006.01)
(52) U.S. Cl. ...................... 342/463; 455/456
(58) Field of Classification Search .............. 342/463, 342/70; 455/456
See application file for complete search history.

(56) References Cited

U.S. PATENT DOCUMENTS

| | | | |
|---|---|---|---|
| 6,580,915 B1 * | 6/2003 | Kroll | 455/456.3 |
| 7,242,306 B2 * | 7/2007 | Wildman et al. | 340/573.1 |
| 2003/0069000 A1 * | 4/2003 | Kindo et al. | 455/345 |
| 2003/0125868 A1 * | 7/2003 | Giannopoulos et al. | 701/200 |
| 2003/0151541 A1 * | 8/2003 | Oswald et al. | 342/70 |
| 2004/0085209 A1 * | 5/2004 | Schmidt et al. | 340/573.4 |
| 2004/0130442 A1 * | 7/2004 | Breed et al. | 340/443 |
| 2005/0184860 A1 | 8/2005 | Taruki et al. | |
| 2005/0250440 A1 * | 11/2005 | Zhou et al. | 455/12.1 |
| 2005/0273218 A1 * | 12/2005 | Breed et al. | 701/2 |
| 2006/0091997 A1 * | 5/2006 | Conner et al. | 340/5.64 |
| 2006/0114104 A1 * | 6/2006 | Scaramozzino | 340/10.2 |

(Continued)

FOREIGN PATENT DOCUMENTS

EP    0 938 190    8/1999

(Continued)

OTHER PUBLICATIONS

Corresponding EP Search Report dated Sep. 26, 2006.

*Primary Examiner*—Thomas H Tarcza
*Assistant Examiner*—Harry Liu
(74) *Attorney, Agent, or Firm*—Jimmy L. Funke

(57) ABSTRACT

A system and method are provided for detecting use of RF transmit devices (e.g., cellular phones) in a vehicle. The system includes a first RF antenna for detecting signal strength of an RF signals transmit device at a first location in a vehicle and a power first detector for generating a first output signal indicative thereof. The system also includes a second antenna for detecting signal strength of the RF signals at a second location in the vehicle and a second power detector for generating a second output signal indicative thereof. The system further includes a signal processor for processing the first and second output signals to determine the presence of an RF transmit device in use in the vehicle and to further determine the location of the RF transmit device to determine if a driver is using the device.

18 Claims, 8 Drawing Sheets

U.S. PATENT DOCUMENTS

2006/0208169 A1* 9/2006 Breed et al. .................. 250/221
2006/0284769 A1* 12/2006 Bolduc et al. ................ 342/463

FOREIGN PATENT DOCUMENTS

| GB | 2 390 264 | | 12/2003 | |
| JP | 2003102058 | | 4/2003 | |
| WO | WO0307513 | * | 1/2003 | ................. 455/456 |

* cited by examiner

VEHICLE RF DEVICE DETECTION SYSTEM AND METHOD

TECHNICAL FIELD

The present invention generally relates to radio frequency (RF) signal detection and, more particularly, relates to detecting the use of an RF transmit device, such as a cellular phone, in a vehicle.

BACKGROUND OF THE INVENTION

Automotive vehicles are commonly equipped with various electronic devices, such as radios, navigation systems, and digital video display (DVD) players which provide entertainment and information onboard the vehicle. Many onboard devices typically include a human machine interface (HMI), such as a display monitor, for displaying information, such as video or map information. The location and availability of some electronic devices onboard the vehicle are generally considered by vehicle manufacturers to minimize distraction to the driver of the vehicle. For example, a DVD is typically installed on the vehicle so that the video is unviewable by the driver of the vehicle, to minimize distraction to the driver of the vehicle.

Access and functionality of some devices made available to the driver and/or passengers onboard a vehicle may be controlled based on a workload management system. The workload management system may actively monitor the cognitive load of the driver and dynamically enable or disable various features and functions for use onboard the vehicle in response to the driving conditions and/or driver awareness. Some device functionality may be limited to use by non-driver passengers only under certain conditions.

While vehicle original equipment manufacturers are generally able to control the location and functionality of some electronic devices to minimize driver distraction, passengers in vehicles may bring other devices onboard the vehicle. For example, passengers often use RF transmit devices, particularly cellular phones, while traveling in the vehicle. The use of a cellular phone by the driver of the vehicle can be a distraction that, without responsible use, may lead to a detrimental driving situation which diminishes the driving performance. Consumer RF transmit devices, such as cellular phones, that are brought onto the vehicle typically operate independent of any workload management system, and thus are generally not taken into consideration to minimize driver distraction.

It is therefore desirable to provide for a system and method for minimizing driver distraction caused by the use of RF transmit devices, such as cellular phones, used onboard a vehicle. It is further desirable to provide for such a system and method for detecting the usage of RF transmit devices, particularly the use of such devices by a driver of the vehicle.

SUMMARY OF THE INVENTION

The present invention provides for a system and method for detecting use and location of RF transmit device(s) in a vehicle. The system includes a first RF signal receiver located in a vehicle for receiving RF signals at a first location generated by an RF transmit device. The system also includes a second RF signal receiver located in the vehicle for receiving RF power signals at a second location generated by the RF transmit device. The system includes one or more RF power detectors for detecting signal strength of each of the RF power signals received at the first and second locations and generating first and second output signals indicative thereof. The system further includes a signal processor for processing the first and second output signals to determine use of an RF transmit device in the vehicle and to further determine location of the RF transmit device in use.

By determining the presence and location of an RF transmit device, such as a cellular phone, in use in the vehicle, the detection system and method may determine whether the driver of the vehicle is using the RF transmit device. Based on knowledge that the driver of the vehicle is using an RF transmit device, one or more systems can be controlled to minimize driver distraction.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
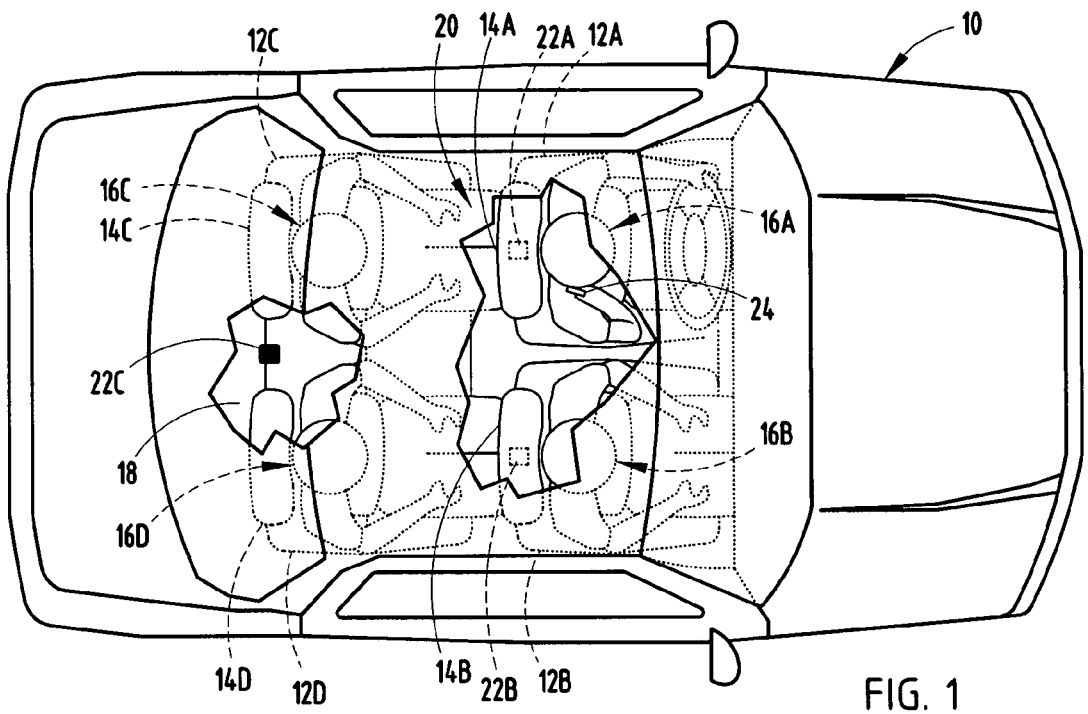
FIG. 1 is a top view of a vehicle illustrating three RF power detecting antennas for detecting RF signals within the vehicle, according to a first embodiment.

Referring now to FIGS. 1-7, the passenger compartment (cockpit) of a vehicle 10 is generally shown equipped with a detection system 20 for detecting use and location of one or more radio frequency (RF) transmit devices, according to various embodiments. The detection system 20 detects RF power signal transmissions at two or more locations in the vehicle 10 to detect the use and location of an RF transmit device 24 in the vehicle 10. According to one embodiment, the detection system 10 detects the use of one or more RF transmit devices, such as cellular phone 24, and the location of the cellular phone 24 when transmitting RF signals.

According to one embodiment, the detection system 20 is able to discriminate and determine if the driver 16A of the vehicle 10 is using an RF transmit device 24. RF transmit device 24 may include a cellular phone, a two-way radio and other RF signal transmission devices that passengers may use onboard the vehicle 10. By knowing that the driver 16A of the vehicle 10 is using an RF transmit device 24, a distraction factor may further be determined. The distraction factor may be used to control the availability of devices and functions onboard the vehicle 10.

With particular reference to FIG. 1, the vehicle 10 is generally shown equipped with four passenger seats 12A-12D for seating four respective passengers 16A-16D. Each seat 12A-12D has a headrest 22A-22D, respectively, generally located at the upper end of the seat back support. The driver 16A of the vehicle 10 is seated in seat 12A and controls operation of the vehicle 10. The remaining passengers 16B-16D generally do not directly control the vehicle operation. Any of passengers 16A-16D may possess and use an RF transmit device, such as a cellular phone 24, onboard the vehicle 10. The detection system 20 is able to detect use and location of an RF transmit device 24, and can thereby determine if the driver 16A is using the RF transmit device 24.

In the first antenna embodiment shown in FIG. 1, three omni-directional antennas 22A-22C are shown at three different locations onboard the vehicle 10 for receiving and collecting RF power signals at three locations within the vehicle 10. Antennas 22A and 22B are mounted in front seat headrests 14A and 14B, respectively, and antenna 22C is located in the rear deck 18 generally between rear seats 12C and 12D. Antenna 22A is nearest the driver 16A and is considered as the reference antenna. RF power signals present within the vehicle 10 are detected at the three locations by antennas 22A-22C and further are processed to determine RF signal strength.

By monitoring signal strength of RF power signals present at multiple locations, the detection system 20 is able to determine when an RF transmit device is used in the vehicle 10, and is further able to determine the approximate location of the RF transmit device 24 in use. For example, by knowing that the signal strength of RF power signals received by reference antenna 22A is greater than the signal strength received by the other antennas 22B and 22C, the detection system 20 is able to determine that the driver 16A of the vehicle 10 is using an RF transmit device 24. Similarly, a sufficiently elevated RF power signal strength received by either of antennas 22B and 22C, as compared to reference antenna 22A, would indicate that a passenger 16B-16D, other than the driver 16A, is using an RF transmit device 24. The signal processing circuitry is shown in FIGS. 8-11.

Figure 2:
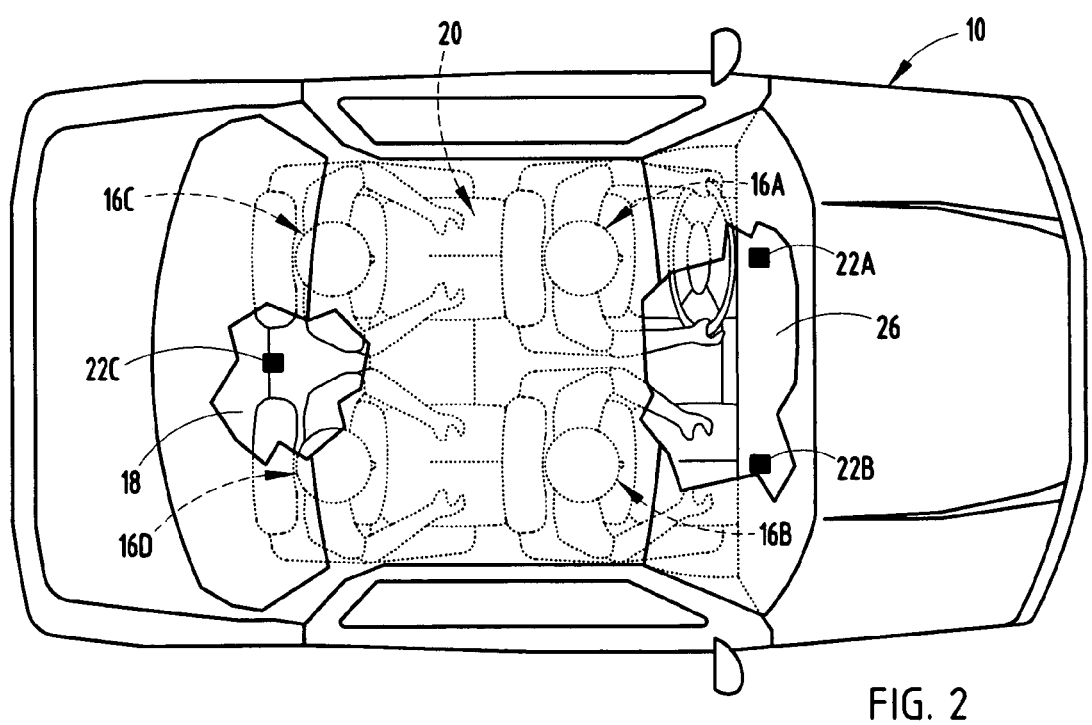
FIG. 2 is a top view of the vehicle illustrating three RF power detecting antennas, according to a second embodiment.

Referring to FIG. 2, an antenna arrangement is illustrated according to a second embodiment employing three antennas 22A-22C. In contrast to the first embodiment, reference antenna 22A and antenna 22B are shown located in the instrument panel 26, generally forward of driver 16A and front passenger 16B. The rear antenna 22C remains located in the rear deck 18. RF power signals measured at the locations of the three antennas 22A-22C are similarly processed to determine use and location of one or more RF transmit devices 24 within the vehicle 10.

Figure 3:
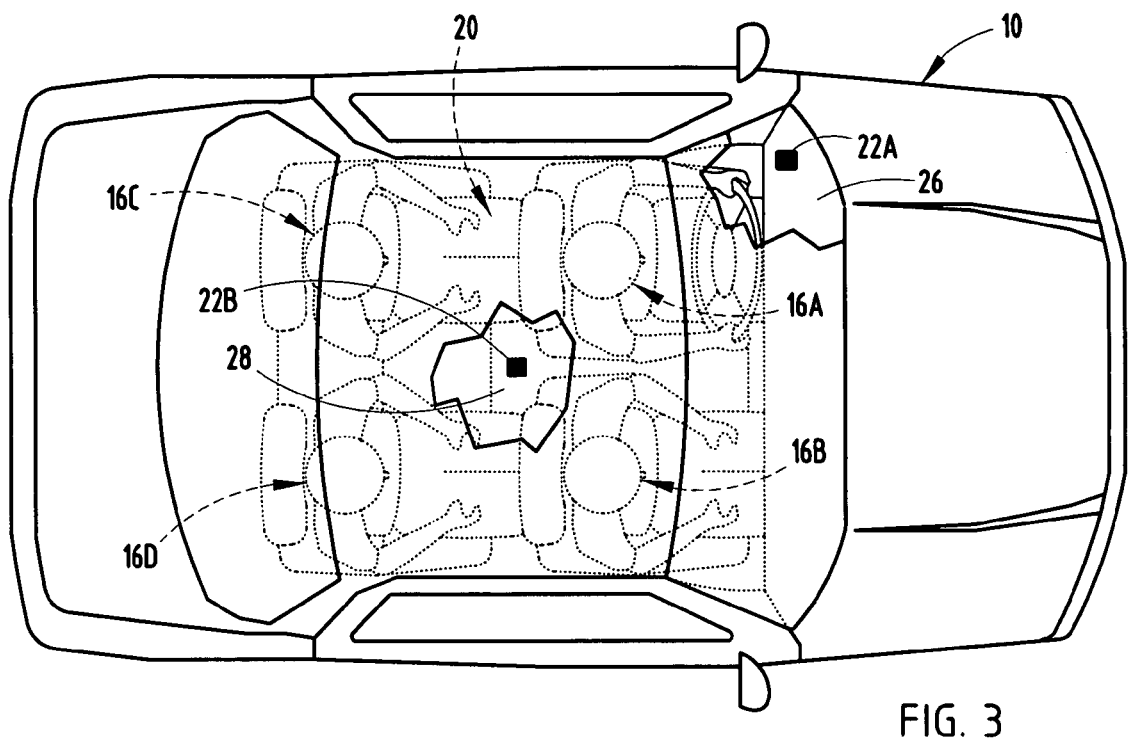
FIG. 3 is a top view of the vehicle illustrating two RF power detecting antennas, according to a third embodiment.

In FIG. 3, an antenna arrangement is shown employing two omni-directional antennas 22A and 22B, according to a third embodiment. In this embodiment, the reference antenna 22A is located in the instrument panel 26, generally forward of the driver 16A. The other antenna 22B is centrally located in the passenger compartment, particularly in the vehicle headliner 28. In this antenna embodiment, the detection system processing circuitry compares the signal strength of RF power signals received by both antennas 22A and 22B. If the RF power signal strength received at the central antenna 22B is sufficiently greater than the RF power signal strength received at the front reference antenna 22A, the detection system 20 determines that the driver 16A is not using an RF transmit device, such as a cellular phone 24.

Figure 4:
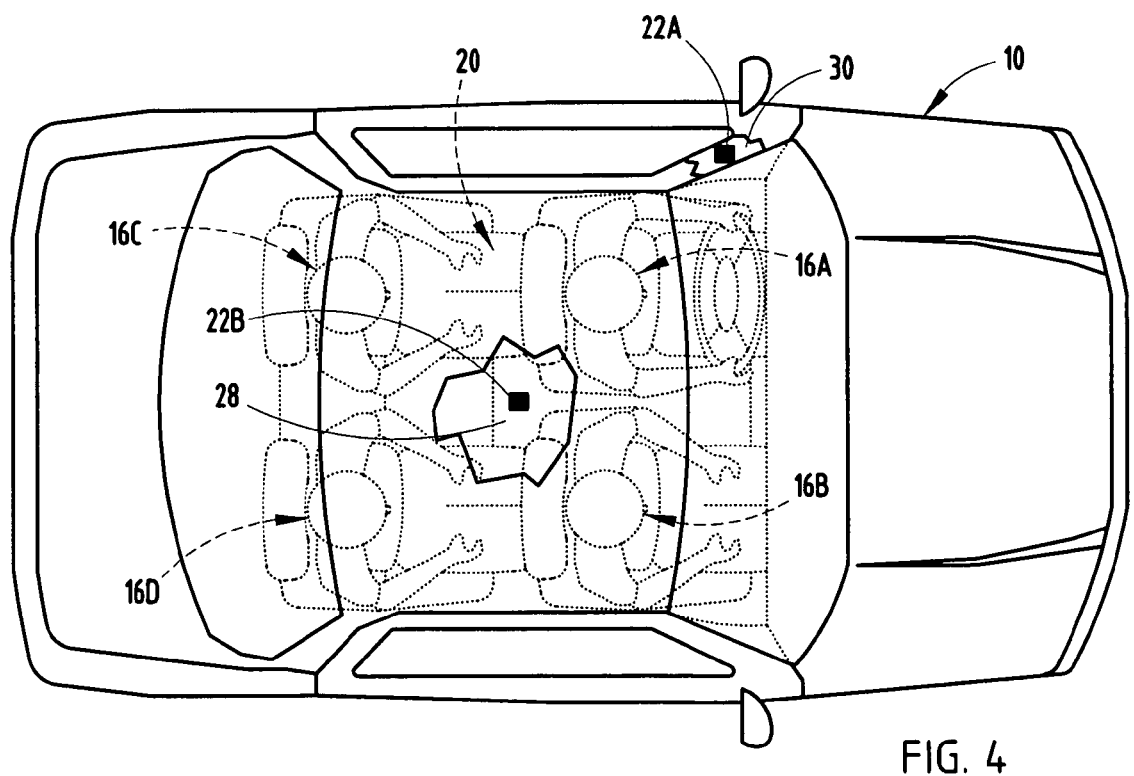
FIG. 4 is a top view of the vehicle illustrating two RF power detecting antennas, according to a fourth embodiment.

A variation of the two antenna arrangement is further illustrated in FIG. 4, according to a fourth embodiment. The forwardmost reference antenna 22A is shown located in the driver's side A-pillar 30 of vehicle 10. The centrally located antenna 22B remains located in the headliner 28. In this embodiment, the detection system processing circuitry similarly compares the RF power strength received at central antenna 22B to the RF power signal strength received at the front reference antenna 22A and concludes that the driver 16A is not using the phone if the central RF power is sufficiently greater than the front RF power.

Figure 5:
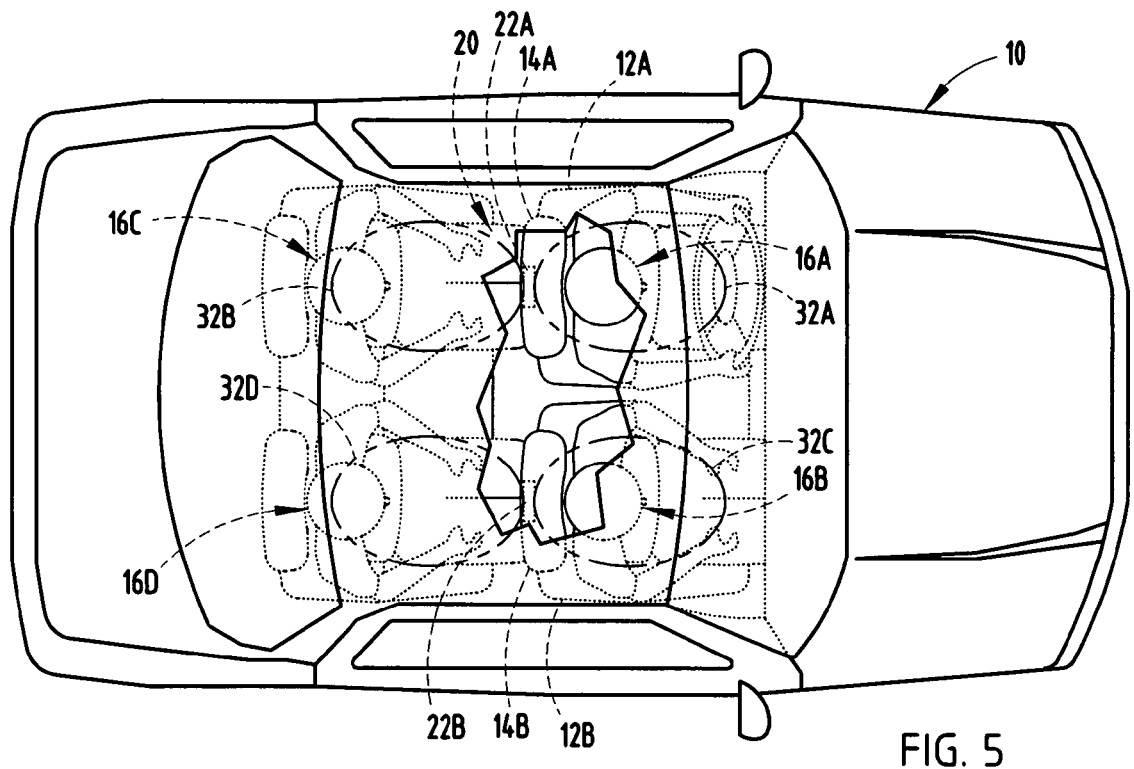
FIG. 5 is a top view of the vehicle illustrating dual two element co-located patch antennas, according to a fifth embodiment.

Referring to FIG. 5, a dual two-element antenna arrangement is illustrated, according to a fifth embodiment. In this embodiment, dual two-element co-located patch antennas 22A and 22B are employed mounted in the respective front seat headrests 14A and 14B. Each of the two-element patch antennas 22A and 22B includes first and second receiving antenna elements for receiving RF power signals in corresponding coverage zones, generally shown on opposite sides of each patch antenna. For example, patch antenna 22A receives RF power signals in each of the forward located driver's zone 32A and rearward located rear passenger zone 32B. The antenna element covering the driver's zone 32A is considered the reference antenna. Similarly, patch antenna 22B receives RF power signals in a forward located passenger zone 32C and rearward located passenger zone 32D. The detection system processing circuitry processes the RF power signals received in each of zones 32A-32D to determine use and location of an RF transmit device 24 in vehicle 10.

Figure 6:
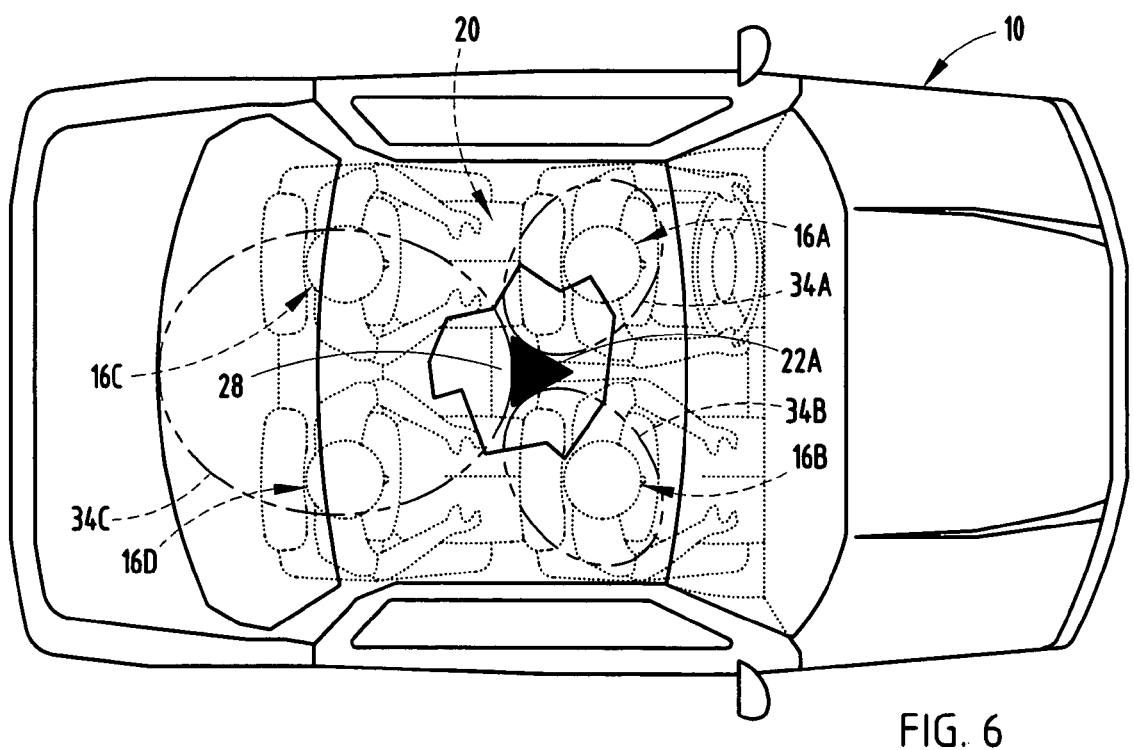
FIG. 6 is a top view of the vehicle illustrating a tri-element co-located patch antenna, according to a sixth embodiment.

In FIG. 6, a single tri-element co-located patch antenna 22A is shown mounted in the headliner 28 centrally located in the passenger compartment of the vehicle 10, according to a sixth embodiment. The tri-element patch antenna 22A includes three antenna elements for receiving RF power signals in three detection zones 34A-34C. The first or reference antenna element covers the first detection zone 34A which includes a front side region where the driver 16A is located. The second antenna element covers the second detection zone 34B which includes a front side region wherein the front passenger 16B is located. The third antenna element covers the third enlarged detection zone 34C which includes a rear region where the rear passengers 16C and 16D are located.

The tri-element patch antenna 22A receives RF power signals from each of the three detection zones 34A-34C via the three respective antenna elements. The signal processing circuit processes the RF power signals from each antenna element and determines the signal strength in each of detection zones 34A-34C, in order to determine use and location of one or more RF transmit device(s) 24 in the vehicle 10.

Figure 7:
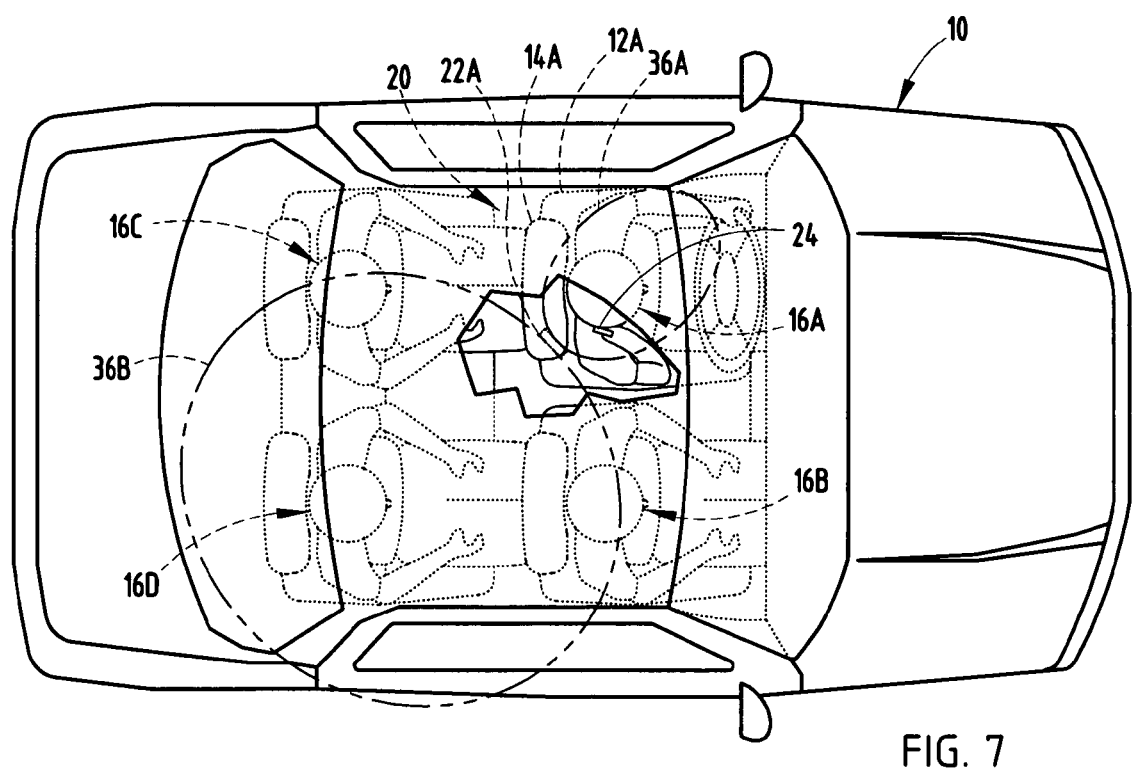
FIG. 7 is a top view of the vehicle illustrating a two-element co-located patch antenna, according to a seventh embodiment.

In FIG. 7, a single two-element patch antenna 22A is shown located in the driver seat headrest 14A, according to a seventh embodiment. The two-element patch antenna 22A includes two antenna elements for monitoring respective first and second coverage zones 36A and 36B. The first or reference antenna element receives RF power signals in first coverage zone 36A generally at the location of the driver 36A of vehicle 10. The second antenna element receives RF power signals in second coverage zone 36B generally within an enlarged region including the location of the remaining passengers 16B-16D in vehicle 10.

While multiple antennas and/or multiple antenna elements are shown in FIGS. 1-7 according to seven embodiments, it should be appreciated that any of a plurality of antennas and/or antenna elements may be employed at various locations onboard vehicle 10 to detect the use and location of RF transmit device(s) 24. For example, antennas that are shown mounted in the headrest(s) could be mounted in the headliner, or vice versa. Additionally, different types and numbers of RF power signal receiving antennas and/or antenna elements may be employed to achieve desired coverage zones, without departing from the teachings of the present invention.

Figure 8:
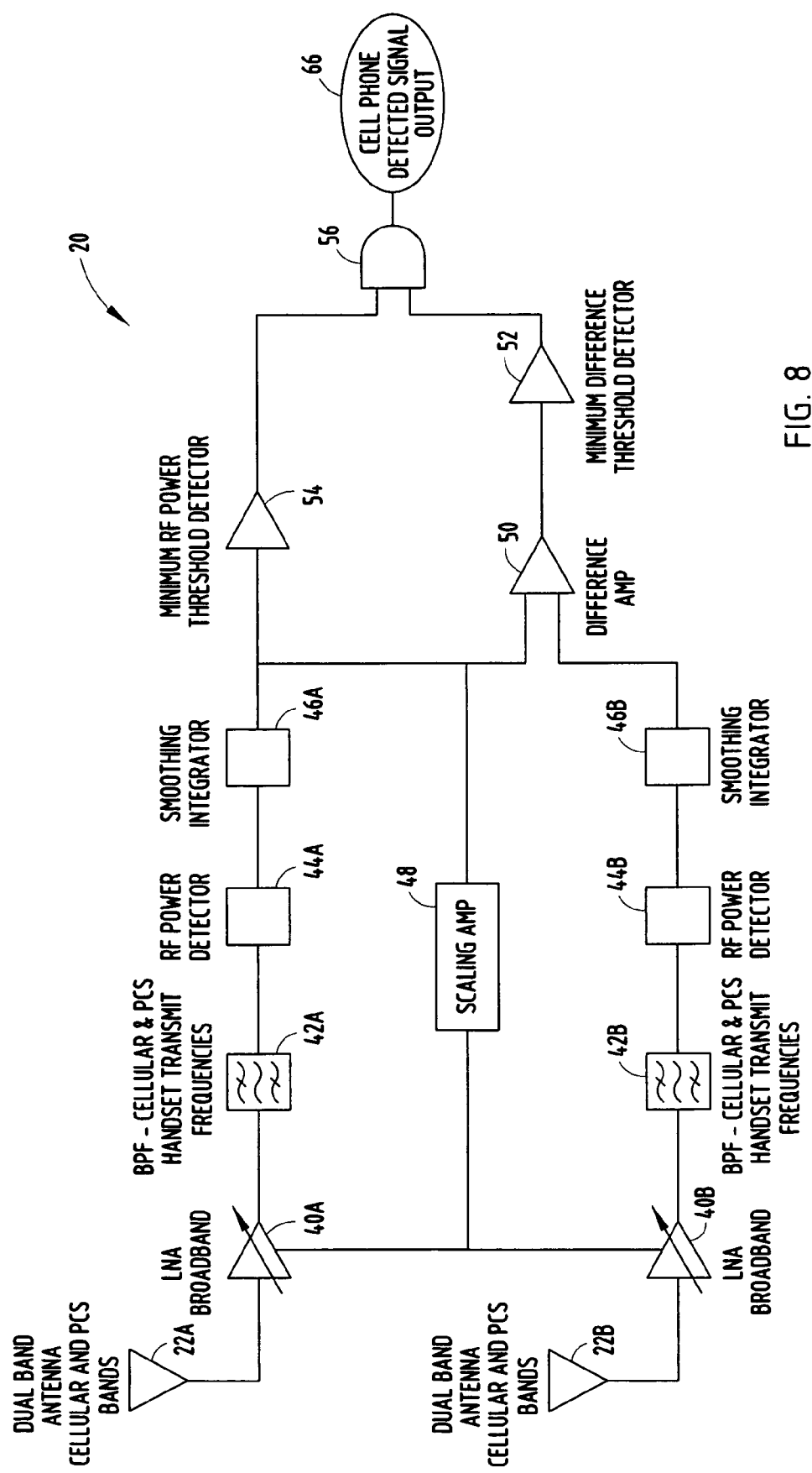
FIG. 8 is a circuit diagram illustrating a two-element analog signal processing circuit, according to one embodiment.

The detection system 20 is illustrated in FIGS. 8-11 having a signal processor implemented as analog and/or digital processing circuitry, according to various embodiments. In FIG. 8, the detection system 20 is shown according to a two antenna embodiment with two antennas (or antenna elements) 22A and 22B each for receiving dual band, e.g., cellular and personal communication system (PCS) band frequency signals (e.g., 824-849 MHz and 1850-1910 MHz transmit frequency range). The RF signals received by each of antennas 22A-22B are processed via analog signal processing circuitry which includes low noise amplifier (LNA) broadband circuits 40A and 40B and bandpass filters (BPF) 42A and 42B. One example of a LNA broadband circuit is Part No. RF2377, commercially available from RF Microdevices, Inc. The bandpass filters 42A and 42B are configured to pass RF power signals in the RF frequency range, e.g., the cellular and PCS handset frequencies.

The signal processing circuitry further includes RF power detectors 44A and 44B. The RF power detectors 44A and 44B detect the signal strength of the corresponding received and filtered signals. RF power detectors 44A and 44B each may include Part No. LT5344, commercially available from Linear Technology Corporation. In the embodiment shown, two or more RF power detectors 44A and 44B are employed, each detecting signal power from different antennas 22A and 22B. However, it should be appreciated that RF signal strength may be detected on a single RF power detector that sequentially samples and detects signal strength of RF signals received by two or more antennas.

The output of each of the RF power detectors 44A and 44B is input to smoothing integrators 46A and 46B, respectively. The smoothing integrators 46A and 46B provides a short term (e.g., two seconds) integration of the detected signal strength signals from RF power detectors 44A and 44B. The integrators 46A and 46B removes short term signal fluctuations.

Outputs of integrator 46A is applied to a feedback scaling amplifier 48. Amplifier 48 applies a scaling factor to each of LNA broadband circuits 40A and 40B. The scaling factor controls the level of amplification of each of LNA broadband circuits 40A and 40B.

The outputs from the two integrators 46A and 46B are also compared to each other via a difference amplifier 50. The difference amplifier 50 computes the difference between the two integrated power signals and generates a difference output signal. The difference output signal is applied to a minimum difference threshold detector 52. If the difference signal exceeds the minimum difference threshold, the minimum difference threshold detector 52 generates a digital high output (i.e., binary 1) as an input to AND logic gate 56. Otherwise, detector 52 generates a digital low (i.e., binary 0) signal as the input to AND logic gate 56.

Additionally, the output of integrator 46A, which includes the RF signals from reference antenna 22A also serves as the reference signal which is applied to a minimum RF power threshold detector 54. If the output of integrator 46A exceeds a minimum RF power threshold, detector 54 generates a digital high output (i.e., binary 1) which is also applied as input to AND logic gate 56. Otherwise, detector 54 generates a digital low output (i.e., binary 0) input to AND logic gate 56. This ensures that both the reference signal from reference antenna 22A exceeds a minimum RF power threshold and that the difference between the processed output signals from the first and second antennas 22A and 22B exceeds the difference threshold in order to determine that an RF transmit device 24 is in use and the driver 16A is using the RF transmit device 24.

The AND logic gate 56 provides a logic output signal indicative of the use of an RF transmit device by the driver of the vehicle detected when the output of integrator 46A exceeds the minimum RF power threshold and the difference signal output from detector 52 exceeds the minimum difference threshold. This output signal is shown as the cell phone detected signal output 66 indicative of a cellular phone in use at a location in a zone where the driver 16A of the vehicle 10 is expected to be located. Because reference antenna 22A is in closer proximity to the driver 16A of vehicle 10, when the processed signal strength received by reference antenna 22A sufficiently exceeds the signal strength received by the other antenna 22B, the detection system 20 presumes that the driver 16A of the vehicle 10 is using the RF transmit device 24.

Figure 9:
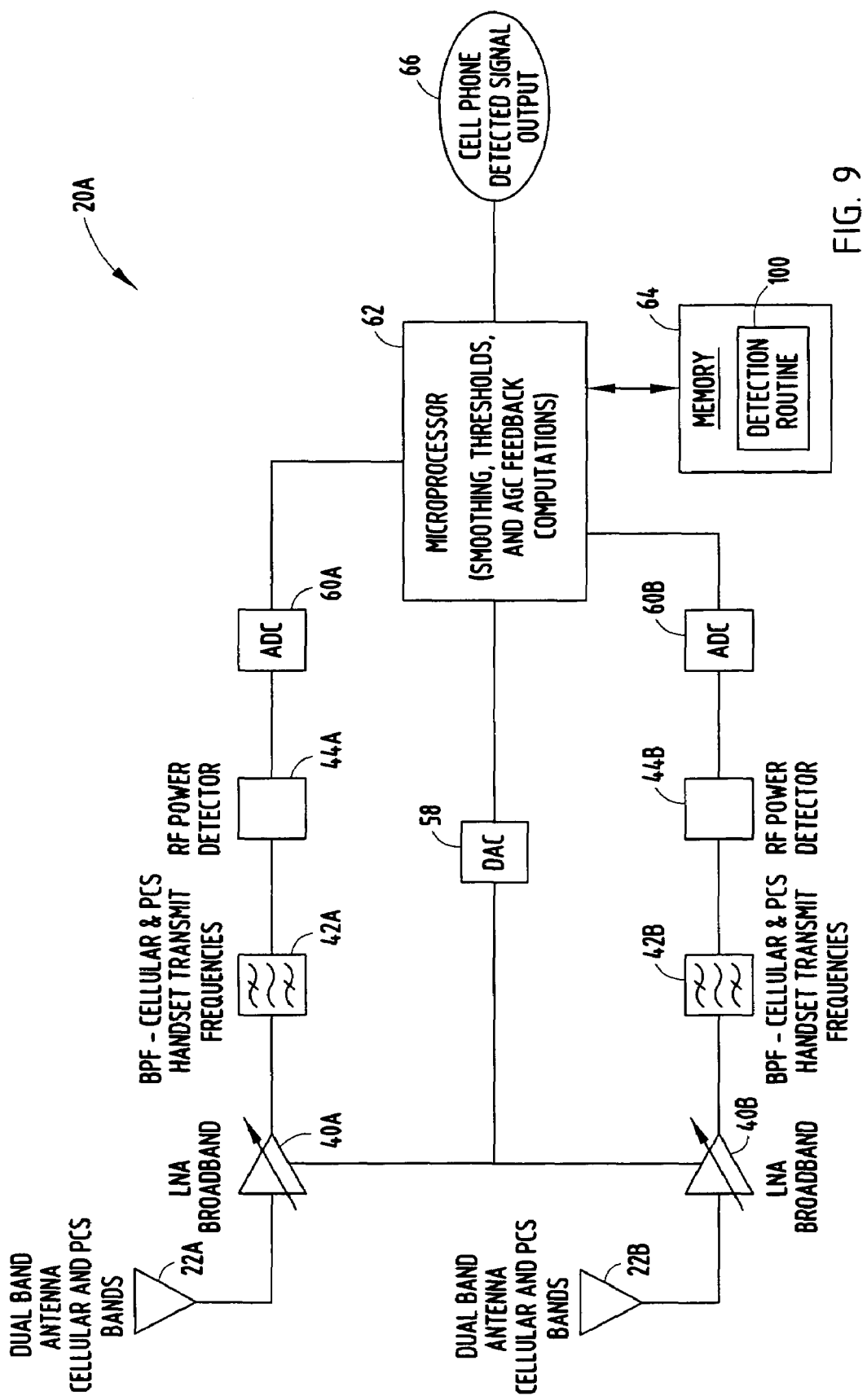
FIG. 9 is a circuit diagram illustrating a two-element digital signal processing circuit, according to another embodiment.

Referring to FIG. 9, the detection system is shown identified by reference identifier 20A employing a two antenna embodiment and a digital signal processor, in contrast to the analog signal process circuitry shown in FIG. 8. In FIG. 9, the RF power signals received by each of antennas 22A and 22B are similarly applied to LNA broadband circuitry 40A and 40B, bandpass filters 42A and 42B, and RF power detectors 44A and 44B, as explained above in connection with the analog signal processing embodiment. In the digital processor embodiment, the output of power detectors 44A and 44B are each applied to an analog-to-digital converter (ADC) 60A and 60B. The ADCs 60A and 60B each convert the analog detected power signals to digital signals, which are then input to a microprocessor 62.

The microprocessor 62 may include any conventional digital processing circuitry for performing various function such as smoothing, threshold comparisons and automatic gain control (AGC) feedback computations, for detecting use and location of an RF transmit device onboard the vehicle. The microprocessor 62 generates an AGC signal that is converted to an analog signal via digital-to-analog converter (DAC) 58. The analog AGC signal is then applied as an input to each of LNA broadband circuits 40A and 40B to control the amplification gain thereof.

The microprocessor 62 communicates with memory 64 which, in turn, stores a detection routine 100. Memory 64 may include volatile and/or non-volatile memory as should be evident to those skilled in the art. The microprocessor 62 processes the digital signals from ADCs 60A and 60B according to detection routine 100 to generate a detected signal output 66 indicative of the use of an RF transmit device, such as a cell phone, by the driver of the vehicle.

Figure 10:
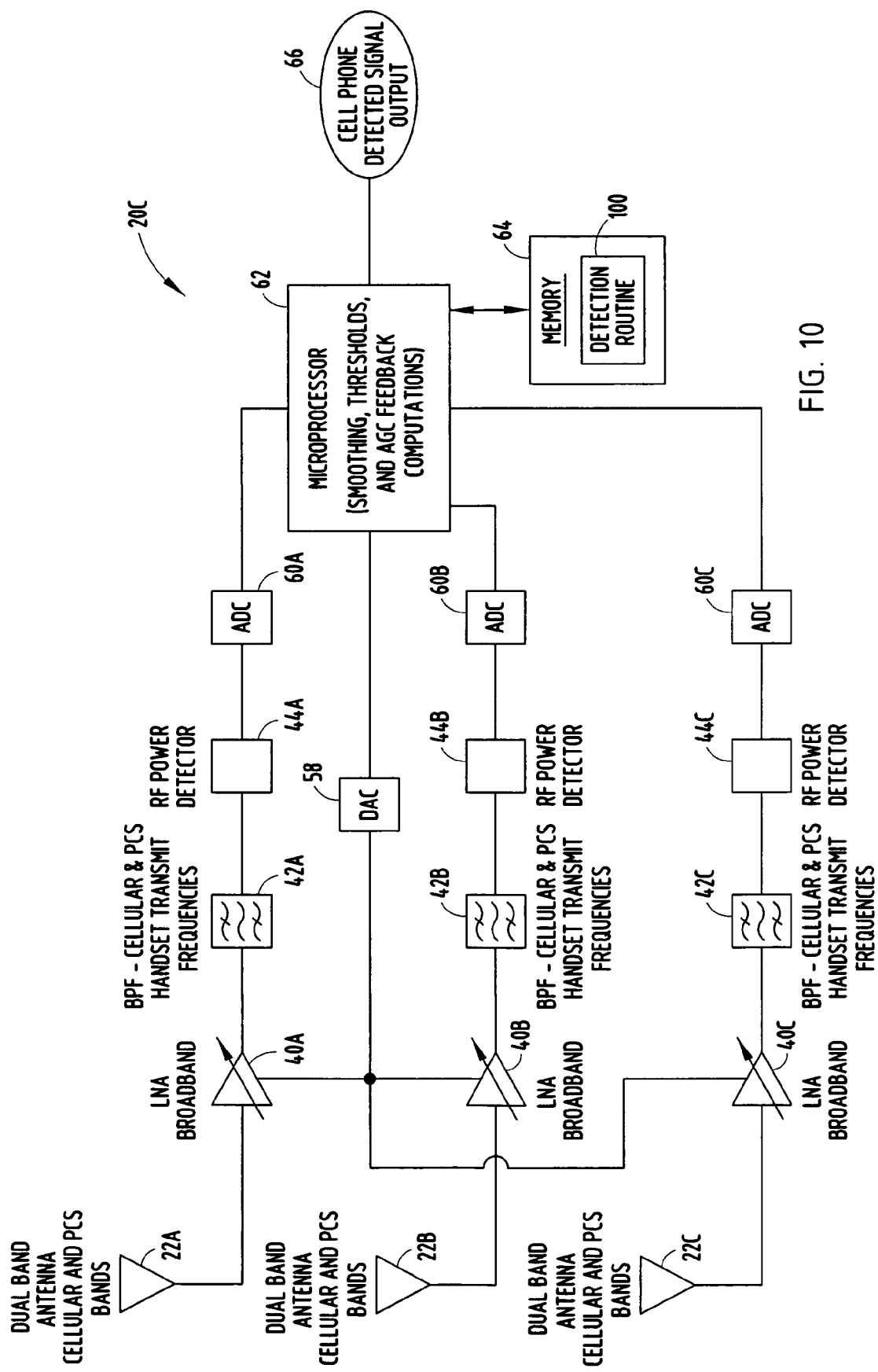
FIG. 10 is a circuit diagram illustrating a three-element digital signal processing circuit, according to a further embodiment.

The detection system is further illustrated by reference identifier 20C in FIG. 10, according to a variation of the digital signal processing embodiment, for processing RF power signals received from three or more antennas or antenna elements. In this embodiment, three antennas 22A-22C are illustrated for receiving RF power signals. The outputs of each of antennas 22A-22C are input to LNA broadband circuitry 40A-40C, bandpass filters 42A-42C, and RF power detectors 44A-44C, respectively. The outputs of the RF power detectors 44A-44C are each applied to respective analog-to-digital converters (ADC) 60A-60C, and the digital output signals thereof are applied as inputs to microprocessor 62.

Microprocessor 62 processes the digital signals according to the detection routine 100 as explained hereinafter. It should be appreciated that additional antennas or antenna elements may be added, the outputs of which could be processed by corresponding LNA broadband circuitry, bandpass filters, RF power detection and analog-to-digital converters, and further processed by microprocessor 62.

Figure 11:
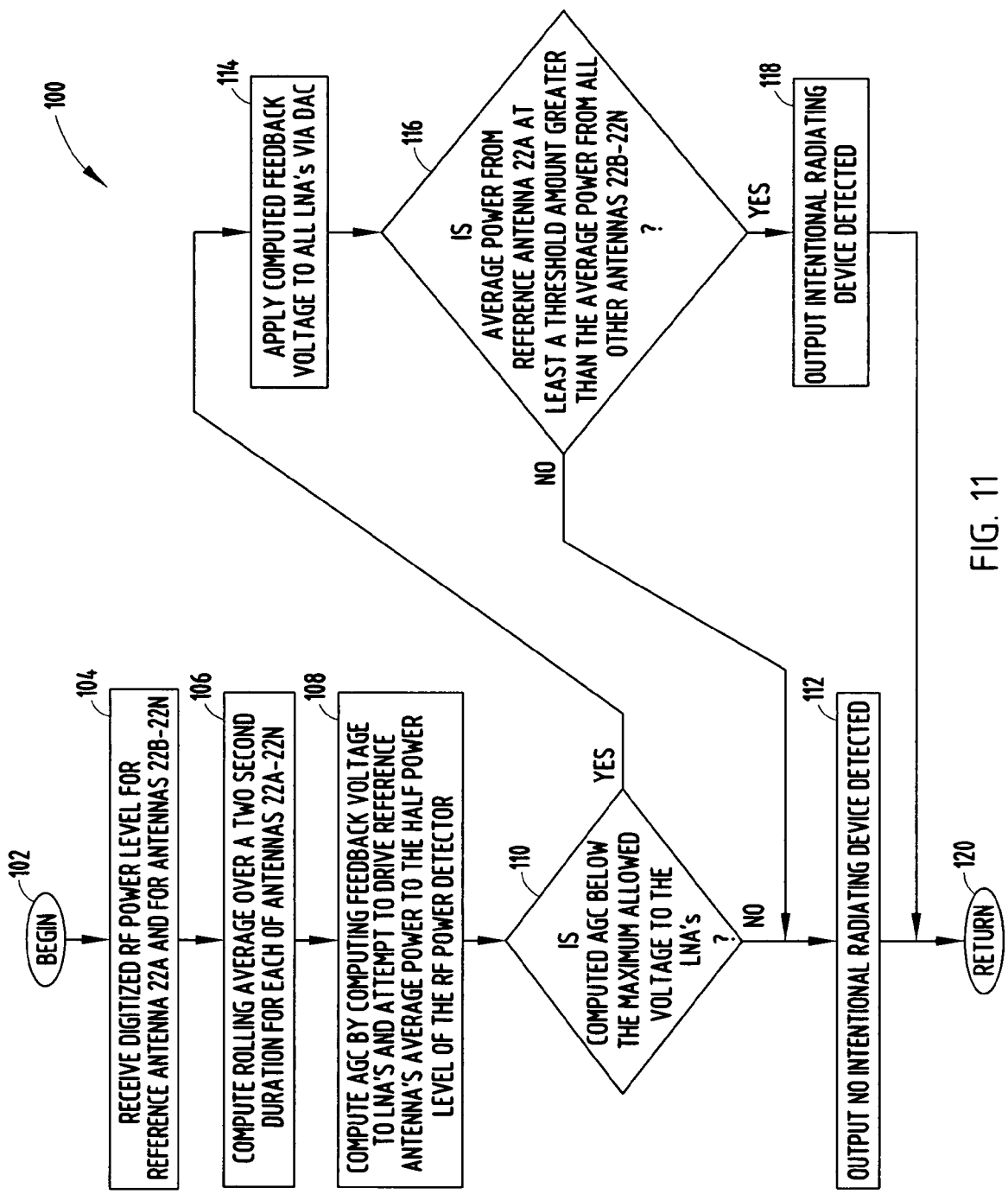
FIG. 11 is a flow diagram illustrating a routine for detecting cellular phone usage and location within a vehicle, according to the digital signal processing embodiment shown in FIG. 10.

The detection routine 100 is illustrated in FIG. 11, according to one embodiment. Routine 100 begins at step 102 and proceeds to step 104 to receive the digitized RF power level for reference antenna 22A, and also receives the digitized RF power level for each of the other antennas 22B-22N. N represents the number of antennas or antenna elements for receiving RF power signals at designated locations onboard the vehicle.

Detection routine 100 proceeds to step 106 to compute a rolling average over a two second duration, according to one example, for each of the processed signals received from antennas 22A-22N. The automatic gain control (AGC) signal is then computed in step 108. Computation of the AGC signal includes computing feedback voltage to the LNA broadband circuits to drive the average power of the reference antenna 22A to the half power level of the RF power detector 44A, in one embodiment. Next, in decision step 110, if the computed AGC signal value is not below the maximum allowed voltage to the LNA broadband circuits, detection routine 100 generates an output that no intentional radiating device is detected in step 112, before returning in step 120.

If the computed AGC signal value is below the maximum allowed voltage to the LNA broadband circuits, detection routine 100 proceeds to step 114 to apply the computed feedback voltage to all LNA broadband circuits via the corresponding series connected digital-to-analog converters. Next, in decision step 116, routine 100 decides if the average power from the reference antenna 22A is at least a threshold amount greater than the average power from each of the other antennas 22B-22N and, if so, generates an output signal indicative of an intentional RF transmit device in use by the driver being detected, in step 118, before returning in step 120. If the average power from the reference antenna 22A is not at least a threshold amount greater than the average power from each of the other antennas 22B-22N, detection routine 100 proceeds to generate an output indicative that no intentional RF transmit device in use by the driver has been detected, in step 112, before returning in step 120.

Accordingly, detection routine 100 determines that an RF transmit device is in use by the driver 16A of the vehicle 10 whenever the RF signal power strength received by the reference antenna 22A is sufficiently greater than the signal strength of RF signals received by the other antennas 22B-22N. Additionally, by knowing that the average power from the reference antenna 22A is sufficiently greater than the average power from the other antennas 22B-22N, the detection routine 100 determines that the driver of the vehicle is likely using the RF transmit device. Thus, detection of use and location of an RF transmit device 24 in a vehicle 10 is provided by the detection system and method of the present invention.

Accordingly, the detection system 20 and method 100 of the present invention advantageously detects the use and location of an RF transmit device 24, such as a cellular phone, in the vehicle 10. By knowing the location of the RF transmit device in use, the system and method may determine that the driver 16A of the vehicle 10 is using the RF transmit device 24.

Knowledge of the driver 16A using an RF transmit device 24 advantageously allows for one or more systems/devices and/or functions to be controlled. For example, a workload management system may use this information to limit the functionality of devices available onboard the vehicle 10 so as to minimize driver distraction. Further, knowledge of the driver's distraction level may be used to adaptively change sensitivity of warning countermeasures, such as forward collision warning or blind spot warning systems, since it is presumed that the potential distraction of the driver may require an earlier warning. Further, assessment of driver distractions could also be utilized to adaptively modify the functionality in an adaptive cruise control system, as well as other systems.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A system for detecting use and location of a RF transmit device in a vehicle, said system comprising:
   a first RF signal receiver located in a vehicle for receiving RF signals at a first location generated by an RF transmit device;
   a second RF signal receiver located in the vehicle for receiving RF signals at a second location generated by the RF transmit device;
   one or more RF power detectors for detecting signal strength of each of the RF signals received at the first and second locations and generating first and second output signals indicative thereof; and
   a signal processor for processing the first and second output signals to determine use of an RF transmit device in use in the vehicle and to further determine location of the RF transmit device in use, wherein the location of the RF transmit device in use is determined based on a comparison of the detected signal strength of the first and second output signals, wherein the vehicle comprises an automobile, and wherein the first location is located generally forward of a driver of the automobile and the second location is located generally rearward of the driver.

2. The system as defined in claim 1, wherein the signal processor further determines if a driver of the vehicle is using the RF transmit device.

3. The system as defined in claim 2, wherein the first location is nearer to the driver than the second location.

4. The system as defined in claim 1, wherein the first RF signal receiver comprises a first receiving antenna covering the first location, and the second RF signal receiver comprises a second receiving antenna covering the second location.

5. The system as defined in claim 4, wherein the first and second receiving antennas each comprises a patch antenna.

6. The system as defined in claim 4, wherein the first antenna is located generally forward of the driver and the second antenna is located generally rearward of the driver.

7. The system as defined in claim 1, wherein the signal processor further determines an intersection between energy patterns of the first and second output signals to determine the location of the RF transmit device in use.

8. The system as defined in claim 1, wherein the signal processor comprises analog circuitry.

9. The system as defined in claim 1, wherein the signal processor comprises a digital controller.

10. The system as defined in claim 1 further comprising a third RF signal receiver located in the vehicle for detecting signal strength of the RF signals at a third location and generating a third output signal indicative thereof, wherein the signal processor further processes the third output signal to determine the use and location of an RF transmit device in the vehicle.

11. The system as defined in claim 10, wherein the RF transmit device comprises a cellular phone.

12. The system as defined in claim 1, wherein the one or more RF power detectors comprises a first power detector for detecting signal strength of RF signals detected at the first location, and a second RF power detector for detecting signal strength of RF transmit signals at the second location.

13. A system for detecting use and location of an RF transmit device in a vehicle, said system comprising:
   a first RF signal power detector located in a vehicle for detecting signal strength of RF transmit signals at a first location and generating a first output signal indicative thereof;
   a second RF signal power detector located in the vehicle for detecting signal strength of RF transmit signals and at a second location and generating a second output signal indicative thereof; and
   a signal processor for processing the first and second output signals to determine use of an RF transmit device in the vehicle and to further determine location of the RF transmit device in use, wherein the location of the RF transmit device in use is determined based on a comparison of the detected signal strength of the first and second output signals, wherein the vehicle comprises an automobile, and wherein the first location is located generally forward of a driver of the automobile and the second location is located generally rearward of the driver.

14. The system as defined in claim 13, wherein the first RF signal power detector comprises a first receiving antenna covering the first location and signal strength detection circuitry, and wherein the second RF signal power detector comprises a second receiving antenna covering the second location and signal strength detection circuitry.

15. The system as defined in claim 14, wherein the first and second receiving antennas each comprise a patch antenna.

16. The system as defined in claim 13, wherein the signal processor further determines an intersection between energy patterns of the first and second output signals to determine the location of the RF transmit device in use.

17. The system as defined in claim 13 further comprising a third RF signal power detector located in the vehicle for detecting signal strength of the RF transmit signals at a third location and generating a third output signal indicative thereof, wherein the signal processor further processes the third output signal to determine the use and location of an RF transmit device in the vehicle.

18. The system as defined in claim 13, wherein the RF transmit device comprises a cellular phone.

* * * * *